United States Patent
Steuer et al.

(10) Patent No.: US 8,313,838 B2
(45) Date of Patent: Nov. 20, 2012

(54) MULTILAYER FILMS OR PLASTICIZER-CONTAINING POLYVINYL ACETAL WITH SOUND-ABSORBING PROPERTIES

(75) Inventors: Martin Steuer, Liederbach (DE); Jan Beekhuizen, Triosdorf (DE); Uwe Keller, Bonn (DE); Kouichiro Isoue, Okayama (JP)

(73) Assignee: Kuraray Europe GmbH, Frankfurt (DE)

( * ) Notice: Subject to any disclaimer, the term of this patent is extended or adjusted under 35 U.S.C. 154(b) by 189 days.

(21) Appl. No.: 12/510,621

(22) Filed: Jul. 28, 2009

(65) Prior Publication Data

US 2010/0028642 A1 Feb. 4, 2010

(30) Foreign Application Priority Data

Aug. 1, 2008 (EP) .................................. 08104948

(51) Int. Cl.
   B32B 17/10 (2006.01)
   B32B 27/42 (2006.01)
(52) U.S. Cl. ......... 428/436; 426/437; 426/524; 426/525
(58) Field of Classification Search .................. 428/436, 428/437, 524, 525
   See application file for complete search history.

(56) References Cited

U.S. PATENT DOCUMENTS

| 3,884,865 | A * | 5/1975 | Fariss et al. | 524/314 |
| 4,276,351 | A * | 6/1981 | Phillips | 428/437 |
| 5,340,654 | A | 8/1994 | Ueda et al. | |
| 6,620,477 | B2 * | 9/2003 | Nagai | 428/46 |
| 7,348,062 | B2 * | 3/2008 | Yuan | 428/437 |
| 2005/0170160 | A1 * | 8/2005 | Moran et al. | 428/214 |
| 2007/0014976 | A1 | 1/2007 | Matsudo | |
| 2007/0231584 | A1 * | 10/2007 | Hasegawa | 428/428 |
| 2009/0126791 | A1 * | 5/2009 | Lu et al. | 136/258 |

FOREIGN PATENT DOCUMENTS

| EP | 0 185 863 B1 | 5/1989 |
| EP | 0 387 148 B1 | 8/1993 |
| EP | 1 118 258 B1 | 3/2003 |
| EP | 1 527 107 B1 | 6/2007 |
| EP | 1 606 325 B1 | 3/2008 |
| JP | 07-206483 A * | 8/1995 |
| JP | 2007-331959 A * | 12/2007 |
| JP | 2007-331964 A * | 12/2007 |
| WO | 02/102591 A1 | 12/2002 |
| WO | 2004/063231 A1 | 7/2004 |
| WO | 2006018419 A1 | 2/2006 |

* cited by examiner

Primary Examiner — D. S. Nakarani
(74) Attorney, Agent, or Firm — Brooks Kushman P.C.

(57) ABSTRACT

An interlayer film for laminated glass with sound-absorbing properties contains at least two individual films, wherein the first individual film comprises a polyvinyl acetal with a portion of polyvinyl acetate groups of 0.1 to 11 mol % and a second individual film comprises a polyvinyl acetal with a portion of polyvinyl acetate groups of between 5 and 8 mol %.

16 Claims, No Drawings

MULTILAYER FILMS OR PLASTICIZER-CONTAINING POLYVINYL ACETAL WITH SOUND-ABSORBING PROPERTIES

BACKGROUND OF THE INVENTION

1. Field of the Invention

The invention relates to a plasticizer-containing film suitable as interlayer in laminated safety glass, the film being composed of at least two individual films based on plasticizer-containing polyvinyl acetals having a different polyvinyl acetate content and exhibiting sound-absorbing characteristics.

2. Description of the Related Art

Laminated safety glass generally consists of two glass panels and an intermediate film, which bonds the glass panels together. Plasticizer-containing, partially acetalized polyvinyl alcohol (polyvinyl acetal), in particular polyvinyl butyral (PVB) is predominantly used as a film material. Laminated safety glass (LSG) is used for example as windshields or side windows in the automotive sector and as safety glass in the construction sector.

A feature of laminated glass that becomes more and more important is its sound-damping characteristics. This can be achieved for example by an interlayer film that is particularly soft and hence sound-absorbing. However, the mechanical stability of these films is often insufficient and they do not exhibit adequate adhesion to glass.

Alternatively, multilayer systems can be used in which the individual layers differ with respect to their mechanical strengths, and thus sound absorption is achieved by mechanical decoupling.

Different mechanical strengths of films based on plasticizer-containing polyvinyl acetal can be adjusted for example via their plasticizer content or the portion of polyvinyl alcohol or polyvinyl acetate groups in the polyvinyl acetal used.

For example, U.S. Pat. No. 5,340,654 describes a multilayer system in which one layer comprises a PVB having a residual acetate content of 8 to 30 mol % and a second layer comprises a PVB having a residual acetate content of less than 4 mol %. U.S. Pat. No. 5,340,654 indicates that PVB having a residual acetate content of less than 8 mol % is unsuitable for sound absorption.

WO 2006/102049 discloses a similar multilayer system in which both PVB partial films have a residual acetate content of less than 5 mol %, different portions of polyvinyl alcohol groups and a different plasticizer content and hence different mechanical strengths.

The production of polyvinyl butyral customarily used for interlayer films occurs on an industrial scale by saponification of polyvinyl acetate to polyvinyl alcohol with desired residual acetate content and the subsequent reaction thereof with an aldehyde to the corresponding polyvinyl acetal with the desired degree of acetalization.

Polyvinyl alcohol is produced from polyvinyl acetate by direct hydrolysis or by alcoholysis. The reaction can be catalyzed by strong acids or bases (cf. Encyclopedia of Polymer Science and Engineering, Wiley, New York 1989, Vol. 17). On an industrial scale, the alcoholysis of polyvinyl acetate with methanol with alkaline catalysis to form methyl acetate and polyvinyl alcohol is preferred. Excess solvent and methyl acetate are removed by distillation after the desired degree of hydrolysis is reached. The degree of hydrolysis of the polyvinyl alcohol can be adjusted via retention time, catalyst concentration and temperature. The production cost of polyvinyl alcohol generally increases with increasing degree of hydrolysis, since on the one hand the yield of polyvinyl alcohol based on polyvinyl acetate decreases and on the other hand catalyst quantity, retention time and quantity of solvents to be distilled increase.

The higher the degree of hydrolysis of the polyvinyl alcohol, the higher are also the process costs in the production of a polyvinyl acetal. On the one hand, this is due to the cost of the polyvinyl alcohol itself that is increasing with the degree of hydrolysis (see previous section). On the other hand, the required amount of aldehyde to obtain a predetermined content of OH groups (expressed as polyvinyl alcohol content of the polyvinyl acetal in percent by weight) increases with the degree of hydrolysis.

The systems described in prior art for multilayer films comprise polyvinyl acetals having a low residual acetate content, i.e. the polyvinyl acetals are made from highly saponified polyvinyl alcohols. This is disadvantageous for the energetic and economical reasons mentioned above.

SUMMARY OF THE INVENTION

It was therefore an object of the present invention to produce interlayer films for laminated glass having sound-absorbing characteristics, which can be produced at reasonable cost by selecting the plasticizer-containing polyvinyl acetals used and still exhibit good sound absorption. It was surprisingly and unexpectedly found that interlayer films based on plasticizer-containing polyvinyl acetals comprising an individual layer of standard PVB and at least one individual layer of polyvinyl acetal having a medium residual acetate content can be produced at reasonable cost, and contrary to information from U.S. Pat. No. 5,340,654, exhibit adequate damping characteristics.

DETAILED DESCRIPTION OF THE PREFERRED EMBODIMENTS

The subject matter of the present invention is therefore directed to interlayer films for laminated glass, which are composed of at least two individual films based on plasticizer-containing polyvinyl acetal, the first individual film comprising a polyvinyl acetal having a portion of polyvinyl acetate groups of 0.1 to 11 mol %, preferably 0.1-4 mol %, more preferably 0.1-2 mol %, and a second individual film comprising a polyvinyl acetal having a portion of polyvinyl acetate groups between 5 and 8 mol %, preferably between 5 and 7.9 mol %, more preferably between 5 and 7.5 mol %, and most preferably between 5 and 7.5 mol %, or between 5.3 and 7.2 mol %.

Determination of the damping characteristics occurs in accordance with ISO/PAS 16940 (as of Jul. 16, 2002) on a test piece consisting of an interlayer film having a thickness of 0.8 mm, which was laminated between two glass panels having a thickness of 2 mm. The first mode was determined each time.

The sound-absorbing effect of the films according to the invention should be highest at the application temperatures of the future glass laminate. With automotive glass, the application temperatures are at about 20° C. since the window is heated in winter and cooled by an air-conditioning unit in summer. In the test set-up mentioned above, films according to the invention preferably exhibit maximum damping in the temperature range of 17.5-22.5° C., in particular, damping values greater than 22%, more preferably greater than 23%, and most preferably greater than 24%.

Preferably, the films according to the invention exhibit in a 2 mm glass/0.8 mm film/2 mm glass laminate measured in accordance with ISO/PAS 16940 (as of Jul. 16, 2002) for the first mode damping values at 10° C. of greater than 10%, at 15° C. of greater than 10%, and at 20° C. of greater than 21%.

The individual films used according to the invention can each be used in almost any thickness provided that the sound insulation characteristics are not adversely altered. All individual films can for example have the same thickness; however, combinations of individual films of varying thickness are also possible. In the preferred arrangement of the interlayer film according to the invention as a triple-layer film A/B/A, the outer films A have largely the same thickness whereas the sound-absorbing film B can be as thin as possible. With a total thickness of the multilayer film of 0.76 mm, the sound-absorbing film may have a thickness of 0.075 to 0.15 mm.

Multilayer films according to the invention preferably have the total thicknesses customary in industry of e.g. 0.38, 0.76, or 1.14 mm (i.e. multiples of 0.38 mm).

The individual films according to the invention comprise plasticizer-containing polyvinyl acetals obtained by acetalizing a fully or partially saponified polyvinyl alcohol with an aldehyde. The first individual film comprises a polyvinyl acetal with a portion of polyvinyl alcohol groups of 17-22% by weight, preferably 18-21% by weight and more preferably 19.5-20.5% by weight. Preferably, the second individual film comprises a polyvinyl acetal with a portion of polyvinyl alcohol groups of less than 14% by weight, preferably 11-13.5% by weight and more preferably less than 11.5-13% by weight.

The compatibility of plasticizer and partially acetalized polyvinyl alcohol generally diminishes with decreasing polar character of the plasticizer. Plasticizers of higher polarity are therefore more compatible with polyvinyl acetal than those having lower polarity. Alternatively, the compatibility of plasticizers of lower polarity increases with increasing degree of acetalization, i.e. with decreasing number of hydroxy groups and hence decreasing polarity of the polyvinyl acetal.

Because of the different portions of polyvinyl alcohol groups, the individual films can take up different amounts of plasticizer without exudation of the plasticizer occurring. Preferably, the individual films therefore comprise a plasticizer content differing by at least 5% by weight, more preferably at least 7.5% by weight and most preferably by at least 10% by weight based on the film formulation.

The individual films can contain the same or different plasticizers. The use of the same plasticizers is preferred; the composition of plasticizer blends in the individual films possibly changing somewhat as a result of migration.

The individual films can comprise plasticizers or plasticizer blends of at least one of the following plasticizers known for PVB film:
- esters of multivalent aliphatic or aromatic acids, for example dialkyl adipates such as dihexyl adipate, dioctyl adipate, hexyl cyclohexyl adipate, mixtures of heptyl and nonyl adipates, diisononyl adipate, heptyl nonyl adipate and esters of adipic acid with cycloaliphatic or ether linkages-containing ester alcohols, dialkyl sebacates such as dibutyl sebacate and esters of sebacic acid with cycloaliphatic or ether linkages-containing ester alcohols, esters of phthalic acid such as butyl benzyl phthalate or bis-2-butoxyethyl phthalate, esters of cyclohexanedicarboxylic acid such as 1,2-cyclohexanedicarboxylic acid diisononyl ester
- esters or ethers of multivalent aliphatic or aromatic alcohols or oligoether glycoles with one or more unbranched or branched aliphatic or aromatic substituents, such as for example esters of di-, tri- or tetraglycoles with linear or branched aliphatic or cycloaliphatic carboxylic acids; diethylene glycol bis(2-ethyl hexanoate), triethylene glycol bis(2-ethyl hexanoate), triethylene glycol bis(2-ethyl butanoate), tetraethylene glycol bis-n-heptanoate, triethylene glycol bis-n-heptanoate, triethylene glycol bis-n-hexanoate, tetraethylene glycol dimethyl ether and/or dipropylene glycol benzoate can serve as examples for the latter group
- phosphates with aliphatic or aromatic ester alcohols such as for example tris(2-ethylhexyl)phosphate (TOF), triethyl phosphate, diphenyl-2-ethylhexyl phosphate, and/or tricresyl phosphate esters of citric acid, succinic acid and/or fumaric acid Particularly preferably, one or more of the following plasticizers is used:
- di(2-ethylhexyl)sebacate (DOS), di(2-ethylhexyl)adipate (DOA), dihexyl adipate (DHA), dibutyl sebacate (DBS), triethylene glycol bis-n-heptanoate (3G7), tetraethylene glycol bis-n-heptanoate (4G7), triethylene glycol bis(2-ethyl hexanoate) (3GO or 3G8), tetraethylene glycol bis(n-2-ethyl hexanoate) (4GO or 4G8), di(2-butoxyethyl)adipate (DBEA), di(2-butoxyethoxyethyl)adipate (DBEEA) di(2-butoxyethyl)sebacate (DBES), di(2-ethylhexyl)phthalate (DOP), di-isononyl phthalate (DINP), triethylene glycol bis-isononanoate, triethylene glycol bis(2-propyl hexanoate), 1,2-cyclohexanedicarboxylic acid diisononyl ester (DINCH), tris(2-ethylhexyl)phosphate (TOF) and dipropylene glycol benzoate In addition, the individual films according to the invention can comprise further additives known to those skilled in the art such as residual amounts of water, UV absorber, antioxidants, adhesion regulators, optical brighteners, stabilizers, colorants, processing aids, organic or inorganic nanoparticles, fumed silica and/or surface active substances.

In a variant of the invention, all individual films comprise the additives mentioned in largely the same concentration. In a particular variant of the invention, at least one of the individual films does not comprise adhesion regulators (antiblocking agents). Within the scope of the present invention, antiblocking agents mean compounds with the help of which the adhesion of plasticizer-containing polyvinyl acetal films to glass surfaces can be adjusted. Compounds of this type are known to those skilled in the art; in practice, alkali or alkaline earth metal salts of organic acids, such as for example potassium/magnesium acetate, are frequently used for this.

It is also possible that at least one of the individual films comprises 0.001 to 20% by weight of $SiO_2$, preferably 1 to 15% by weight, most preferably 5 to 10% by weight, optionally doped with $Al_2O_3$ or $ZrO_2$, to improve stiffness.

To ensure that the interlayer films according to the invention have improved damping characteristics, the polyvinyl acetals usable for the invention in the different individual films preferably have different glass transition temperatures (Tg). The glass transition temperature of the polyvinyl acetal in the first individual film is preferably greater than 70° C. The glass transition temperature of the polyvinyl acetal in the second individual film with insulating effect is independently thereof preferably less than 70° C., more preferably in the range of 64-69° C.

To produce polyvinyl acetal, polyvinyl alcohol is dissolved in water and acetalized with an aldehyde such as butyraldehyde with addition of an acid catalyst. The precipitated polyvinyl acetal is separated, washed to neutrality, optionally suspended in an aqueous medium rendered alkaline, afterwards again washed to neutrality, and dried.

The polyvinyl alcohol content of the polyvinyl acetal can be adjusted through the quantity of the aldehyde used in the acetalization. It is also possible to perform the acetalization using other or several aldehydes having 2-10 carbon atoms (for example valeraldehyde).

The films based on plasticizer-containing polyvinyl acetal preferably contain uncrosslinked polyvinyl butyral (PVB) obtained by acetalizing polyvinyl alcohol with butyraldehyde.

The use of crosslinked polyvinyl acetals, in particular crosslinked polyvinyl butyral (PVB), is also possible. Suitable crosslinked polyvinyl acetals are described for example in EP 1527107 B1 and WO 2004/063231 A1 (thermal self-crosslinking of carboxyl group-containing polyvinyl acetals), EP 1606325 A1 (polyvinyl acetals crosslinked with polyaldehydes), and WO 03/020776 A1 (Polyvinyl acetals crosslinked with glyoxylic acid). The disclosure of these patent applications is fully incorporated herein by reference.

Terpolymers of hydrolyzed vinyl acetate/ethylene copolymers can also be used as polyvinyl alcohol within the scope of the present invention. These compounds are normally hydrolyzed to more than 92 mol % and contain 1 to 10% by weight of ethylene-based units (for example type "Exceval" of Kuraray Europe GmbH).

Furthermore, hydrolyzed copolymers made of vinyl acetate and at least one additional ethylenically unsaturated monomer can also be used as polyvinyl alcohol within the scope of the present invention.

Within the scope of the present invention, the polyvinyl alcohols can be used pure or as a mixture of polyvinyl alcohols having a different degree of polymerization or degree of hydrolysis. It is possible that the interlayer films according to the invention consist of 2, 3, 4 or 5 individual films, adjacent individual films having the mentioned different properties.

Preferably, the films according to the invention have three individual films, the first and third individual film being identical.

The use of a soft film comprising polyvinyl acetal with a portion of polyvinyl acetate groups between 5 and 8 mol %, which is disposed between two films comprising polyvinyl acetal with a portion of polyvinyl acetate groups of 0.1 to 11 mol %, preferably 0.1-4 mol %, more preferably 0.1-2 mol %, is particularly preferred.

This has the advantage that in a corresponding glass/glass laminate, the sides of the multilayer film directed towards the glass have the same adhesion properties. Within the scope of the present invention, the middle film is then classified as second individual film and has the properties mentioned.

To produce the films according to the invention, the individual films can first be produced individually by extrusion and subsequently joined mechanically to the interlayer film according to the invention for example by winding them up together on a film winder.

It is also possible to produce the interlayer film by simultaneous coextrusion of the individual films. The coextrusion can for example occur using an appropriately equipped coextrusion die or a feed block.

In the automotive sector, films having a so-called tinted band in the upper region are frequently used. For this, either the upper part of the film can be coextruded with an appropriately pigmented polymer melt, or one of the individual films in a multilayer system can have a different color. In the present invention, this is realizable by complete or partial pigmenting of at least one individual film.

The production of the films or individual films according to the invention normally occurs by extrusion or coextrusion which yield under certain conditions (melt pressure, melt temperature and die temperature) a melt fracture surface, i.e. a stochastic surface roughness.

Alternatively, a regular, non-stochastic roughness can be embossed onto an already produced interlayer film according to the invention by an embossing process between at least one pair of rollers. Embossed films normally have improved deaeration characteristics during laminated glass production and are preferably used in the automotive sector.

Films according to the invention have, independent of the production method, a surface structure applied to one side or more preferably to both sides with a roughness $R_z$ of 15 to 150 µm, preferably a $R_z$ of 15 to 100 µm, more preferably a $R_z$ of 20 to 80 µm, and most preferably a $R_z$ of 40 to 75 µm.

Films according to the invention are also well suited for the production of glass/film/plastic laminates, such as for example for the permanent bonding of a glass panel with a PET layer. The bonding of two plastic panels, for example made of polycarbonate or PMMA, is also possible with the films according to the invention.

The films according to the invention can be used in particular for the production of laminated safety glass by laminating with one or more glass panels in a manner known to those skilled in the art. The laminated safety glass can be used in the automotive sector, for example as windshield, or also in the architectural sector, for example in windows or transparent facade elements, or in furniture manufacturing.

A further use of the films according to the invention is in the production of photovoltaic modules.

The production and composition of films based on polyvinylacetals is described in principle for example in EP 185 863 B1, EP 1 118 258 B1, WO 02/102591 A1, EP 1 118 258 B1 or EP 387 148 B1.

Measuring Procedures

The Ester Number EN of polyvinyl alcohol is determined in accordance with DIN EN ISO 3681. The Degree of Hydrolysis DH is calculated from the ester number as follows:

DH[mol %]=100*(100−0.1535*EN)/(100−0.0749*EN)

Determination of the Polyvinyl Alcohol and Polyvinyl Acetate Content of PVB occurs in accordance with ASTM D 1396-92. The degree of acetalization (=butyral content) can be calculated as the portion that needs to be added to the sum of polyvinyl alcohol and polyvinyl acetate content determined in accordance with ASTM D 1396-92 to reach one hundred. The conversion of wt % into mol % occurs according to formulas known to those skilled in the art.

The Plasticizer Content of the films is determined by dissolving the film in ethanol and subsequent quantitative gas chromatography. To determine the plasticizer content of the individual films, the multilayer films have to be separated again after a conditioning time of about 1 week, i.e. after the plasticizer migration is largely completed, and individually measured.

Film Roughness:

Measurement of the surface roughness $R_z$ or the roughness value $R_z$ occurs in accordance with DIN EN ISO 4287. The specified measurements were performed using a roughness measuring device from Mahr type S2, drive unit PGK with mechanical skidded pick-up MFW-250. The cutoff wavelength $\lambda_c$, total evaluation length $l_m$, number and length of the sampling lengths $l_e$ and pre-travel and post-travel length $l_v$ and $l_n$, respectively, are chosen in accordance with the standard mentioned above.

Determination of the Glass Transition Temperature of the partially acetalized polyvinyl alcohol occurs by means of Differential Scanning Calorimetry (DSC) in accordance with DIN 53765 using a heating rate of 10 K/min in the temperature interval of −50° C.-150° C. A first heating ramp, followed by a cooling ramp, followed by a second heating ramp is used. The position of the glass transition temperature is determined from the measured curve associated with the second heating ramp in accordance with DIN 51007. The DIN center (Tg DIN) is defined as intersection of a horizontal line at half step height with the measured curve. The step height is defined by the vertical distance of the two intersections of the middle tangent with the base lines of the measured curve before and after the glass transition.

Measurement of the Damping Behavior

The damping characteristics of the films are determined by measuring the mechanical impedance in accordance with ISO/PAS 16940 (as of Jul. 16, 2002). For this, the films are laminated between two glass panels with a thickness of 2 mm and from it a test piece with the dimensions 300*25 mm is cut. Onto this glass sample, a cement stud (type UA 0866/Brüel&Kjaer) is applied in the middle using cyanoacrylate adhesive, which allows to directly connect the sample via a thread with an impedance head (type 8001/Brüel&Kjaer GmbH). This impedance head allows the simultaneous measurement of force and acceleration at a point of the glass sample over a frequency range of 1-10,000 Hz. The impedance head is located directly on the vibration table of a vibration exciter (type 4809/Brüel&Kjaer GmbH), via which the desired forces are transmitted. Both are located in a controllable, isolated heating chamber (Binder), which allows the determination of the damping characteristics over a temperature range of preferably 0-40° C. Now, noise is generated by means of a noise signal generator (PULSE Front-end Type 3560B-040/Brüel&Kjaer GmbH), which simultaneously functions as signal receiver. The noise is fed via a power amplifier (type 2718/Brüel&Kjaer GmbH) into the vibration exciter. The frequency range thereby comprises 0 to 5,000 Hz. Now, the response of the glass sample to the generated vibrations can be measured at different temperatures directly via the impedance head by means of the acquired force/acceleration signals and analyzed using analysis software (PULSE FFT Analysis type 7770N2/Brüel&Kjaer GmbH). From the determined transfer function of force and acceleration, the different natural frequencies f of the vibration modes n of the glass samples and their half widths can be determined. The half width Δf is thereby chosen at 3 dB below the signal maximum. Via the relationship η=Δf/f, the loss factor η or the damping at the different natural frequencies can be determined. A high loss factor or a high percent damping value is a measure for the quality of the sound absorption characteristics. A damping curve that is as broad as possible in the observed temperature range of 0-40° C. is thereby of interest.

Since the damping characteristics of a material depend on the temperature, the samples were measured in the selected temperature range in intervals of 5° C., which covers in principle the application range of the sound-absorbing glass.

EXAMPLES

Preparation of Polyvinyl Acetals Having Different Residual Acetate Content

PVB 1:

100 parts by weight of polyvinyl alcohol Mowiol 28-99 (commercial product of Kuraray Europe GmbH) was dissolved in 1075 parts by weight of water with heating to 90° C. At a temperature of 40° C., 56.8 parts by weight of n-butyraldehyde was added, and at a temperature of 12° C. while stirring, 75 parts by weight of 20% hydrochloric acid was added. The mixture was heated to 69° C. after the polyvinyl butyral (PVB) had precipitated and stirred at this temperature for 2 hours. The PVB was separated after cooling to room temperature, washed to neutrality with water, and dried. A PVB having a polyvinyl alcohol content of 20.0% by weight (28.8 mol %) and a polyvinyl acetate content of 1.3% by weight (1 mol %) was obtained.

PVB 2:

The PVB preparation occurred in accordance with Example 1; 100 parts by weight of polyvinyl alcohol Mowiol 30-92 (commercial product of Kuraray Europe GmbH) with a degree of hydrolysis of 93.1 mol % and 66 parts by weight of n-butyraldehyde were used. A PVB having a polyvinyl alcohol content of 12.7% by weight (19.3 mol %) and a polyvinyl acetate content of 9.1% by weight (7 mol %) was obtained.

PVB 3:

The PVB preparation occurred in accordance with Example 1; 78 parts by weight of n-butyraldehyde was used. A PVB having a polyvinyl alcohol content of 12.5% by weight (18.8 mol %) and a polyvinyl acetate content of 1.3% by weight (1 mol %) was obtained.

PVB 4:

The PVB preparation occurred in accordance with Example 1; 75 parts by weight of n-butyraldehyde was used. A PVB having a polyvinyl alcohol content of 13% by weight (19.4 mol %) and a polyvinyl acetate content of 1.4% by weight (1.1 mol %) was obtained.

PVB 5:

The PVB preparation occurred in accordance with Example 2; 64 parts by weight of n-butyraldehyde was used. A PVB having a polyvinyl alcohol content of 13.1% by weight (19.8 mol %) and a polyvinyl acetate content of 9% by weight (7 mol %) was obtained.

PVB 6:

The PVB preparation occurred in accordance with Example 2; 65 parts by weight of n-butyraldehyde was used. A PVB having a polyvinyl alcohol content of 12.9% by weight (19.5 mol %) and a polyvinyl acetate content of 8.9% by weight (6.9 mol %) was obtained.

PVB 7:

The PVB preparation occurred in accordance with Example 2; 73 parts by weight of n-butyraldehyde was used. A PVB having a polyvinyl alcohol content of 11.6% by weight (17.7 mol %) and a polyvinyl acetate content of 9.1% by weight (7.1 mol %) was obtained.

PVB 8:

The PVB preparation occurred in accordance with PVB 7; a Mowiol 30-92 lot having a degree of hydrolysis of 93.6 mol % was used. A PVB having a polyvinyl alcohol content of 12.3% by weight (18.7 mol %) and a polyvinyl acetate content of 8.3% by weight (6.5 mol %) was obtained.

PVB 9:

The PVB preparation occurred in accordance with PVB 7; a Mowiol 30-92 lot having a degree of hydrolysis of 94.1 mol % was used. A PVB having a polyvinyl alcohol content of 13% by weight (19.7 mol %) and a polyvinyl acetate content of 7.8% by weight (6.0 mol %) was obtained.

PVB 10:

The PVB preparation occurred in accordance with PVB 7; a Mowiol 30-92 lot having a degree of hydrolysis of 94.5 mol % was used. A PVB having a polyvinyl alcohol content of 13.8% by weight (20.8 mol %) and a polyvinyl acetate content of 7.0% by weight (5.4 mol %) was obtained.

In Table 1, the chemical compositions of the polyvinyl butyrals mentioned above and the polyvinyl alcohols used are listed.

From Table 2, the economic advantages resulting from the use of a polyvinyl alcohol with decreased degree of hydrolysis (higher yield based on polyvinyl acetate, reduced quantity of aldehyde to obtain a comparable content of OH groups of the polyvinyl acetal) are evident. Mowiol is the trade name for polyvinyl alcohol of Kuraray Europe GmbH, the following numbers identifying the type.

TABLE 1

| PVB | Polyvinyl alcohol content of PVB [wt %] | Polyvinyl acetate content of PVB [wt %] | Degree of acetalization (=butyral content) [wt %] | Polyvinyl alcohol content of PVB [mol %] | Polyvinyl acetate content of PVB [mol %] | Degree of acetalization (=butyral content) [mol %] |
|---|---|---|---|---|---|---|
| 1 | 20 | 1.3 | 78.7 | 28.8 | 1 | 70.2 |
| 2 | 12.7 | 9.1 | 78.2 | 19.3 | 7 | 73.7 |
| 3 | 12.5 | 1.3 | 86.2 | 18.8 | 1 | 80.2 |
| 4 | 13 | 1.4 | 85.6 | 19.4 | 1.1 | 79.5 |
| 5 | 13.1 | 9 | 77.9 | 19.8 | 7 | 73.2 |
| 6 | 12.9 | 8.9 | 78.2 | 19.5 | 6.9 | 73.6 |
| 7 | 11.6 | 9.1 | 79.3 | 17.7 | 7.1 | 75.2 |
| 8 | 12.3 | 8.3 | 79.4 | 18.7 | 6.5 | 74.8 |
| 9 | 13 | 7.8 | 79.2 | 19.7 | 6 | 74.3 |
| 10 | 13.8 | 7 | 79.2 | 20.8 | 5.4 | 73.8 |

TABLE 2

| PVB | Polyvinyl alcohol used (PVA) | Degree of hydrolysis of PVA [mol %] | Yield of PVA, based on 100 parts of polyvinyl acetate [%] | Quantity of butyraldehyde [parts by weight per 100 pbw of PVA] | Polyvinyl alcohol content of PVB [wt %] |
|---|---|---|---|---|---|
| 1 | Mowiol 28-99 | 99.2 | 51.5 | 56.8 | 20 |
| 2 | Mowiol 30-92 | 93.1 | 54.5 | 66 | 12.7 |
| 3 | Mowiol 28-99 | 99.2 | 51.5 | 78 | 12.5 |
| 4 | Mowiol 28-99 | 99.2 | 51.5 | 75 | 13 |
| 5 | Mowiol 30-92 | 93.1 | 54.5 | 64 | 13.1 |
| 6 | Mowiol 30-92 | 93.1 | 54.5 | 65 | 12.9 |
| 7 | Mowiol 30-92 | 93.1 | 54.5 | 73 | 11.6 |
| 8 | Mowiol 30-92 | 93.6 | 54.3 | 73 | 12.3 |
| 9 | Mowiol 30-92 | 94.1 | 54 | 73 | 13 |
| 10 | Mowiol 30-92 | 94.5 | 53.8 | 73 | 13.8 |

For the purpose of this invention, different glass/glass laminates were produced, which comprise as interlayer the films according to the invention in the form of three combined individual films, films A and C being in direct contact with the glass surface and film B being laminated between films A and C. Tables 3 and 4 show the composition of the individual films.

The examples listed in Tables 5 and 6 comprise individual films A and C in a thickness of 0.3 mm and individual film B in a thickness of 0.2 mm; the individual films were laminated to a composite by laying them on top of one another.

Because of the different plasticizer contents in individual films A/C and B, plasticizer diffusion into or out of the middle layer can occur after lamination between two glass panels. The percentage thereby depends on the plasticizer amount of the individual film A and C used. As expected, the largest plasticizer content is found in the middle layer (individual film B) with use of individual film A1 having 28.5% by weight of plasticizer as an outer layer. Depending on the taken-up plasticizer amount of individual film B, the maximum of the damping shifts, together with a decreased glass transition temperature of individual film B, to lower temperatures. Hence, it is necessary to adhere exactly to the layer composition (PVOH content, PVAcetate content, plasticizer content) to adjust the desired damping characteristics. In the listed examples, the same compositions were chosen for individual films A and C.

The damping characteristics listed in Table 6 were determined in accordance with ISO/PAS 16940 (as of Jul. 16, 2002) as described above. To obtain damping characteristics that are as good as possible over a large temperature range, interlayer films according to the invention have at 10° C. damping values of greater than 10%, preferably greater than 11% and more preferably greater than 12%.

TABLE 3

| Individual film A or C | PVB | Tg of PVB, DIN [° C.] | PVAlcohol/wt % | PVAcetate/mol % | Butyral/wt % | Plasticizer/wt % |
|---|---|---|---|---|---|---|
| A1 | 1 | 74.9 | 20 | 1 | 78.7 | 28.5 |
| A2 | 1 | 74.9 | 20 | 1 | 78.7 | 27.5 |
| A3 | 1 | 74.9 | 20 | 1 | 78.7 | 26.5 |

TABLE 4

| Individual film B | PVB | Tg of PVB, DIN [° C.] | PVAlcohol/wt % | PVAcetate/wt % | PVAcetate/mol % | Butyral/wt % | Plasticizer/wt % |
|---|---|---|---|---|---|---|---|
| B1 | 2 | 65.7 | 12.7 | 9.1 | 7 | 78.2 | 37.5 |
| B2 | 3 | 68 | 12.5 | 1.3 | 1 | 86.2 | 37.5 |

TABLE 4-continued

| Individual film B | PVB | Tg of PVB, DIN [° C.] | PVAlcohol/wt % | PVAcetate/ wt % | PVAcetate/ mol % | Butyral/wt % | Plasticizer/ wt % |
|---|---|---|---|---|---|---|---|
| B3 | 4 | 68.8 | 13 | 1.4 | 1.1 | 85.6 | 37.5 |
| B4 | 5 | 66.2 | 13.1 | 9 | 7 | 77.9 | 37.5 |
| B5 | 6 | 66.2 | 12.9 | 8.9 | 6.9 | 78.2 | 37.5 |
| B6 | 7 | 65.2 | 11.6 | 9.1 | 7.1 | 79.3 | 37.5 |
| B7 | 8 | 65.9 | 12.3 | 8.3 | 6.5 | 79.4 | 37.5 |
| B8 | 9 | 66.3 | 13 | 7.8 | 6 | 79.2 | 37.5 |
| B9 | 10 | 66.9 | 13.8 | 7 | 5.4 | 79.2 | 37.5 |

TABLE 5

| Example | Layer architecture of individual films | Layer thickness [mm] A/B/A | Difference in plasticizer content/wt % |
|---|---|---|---|
| 1 | A1/B1/A1 | 0.3/0.2/0.3 | 9 |
| 2a | A1/B2/A1 | 0.3/0.2/0.3 | 9 |
| 2b | A2/B2/A2 | 0.3/0.2/0.3 | 10 |
| 2c | A3/B2/A3 | 0.3/0.2/0.3 | 11 |
| 3 | A2/B3/A2 | 0.3/0.2/0.3 | 10 |
| 4 | A2/B4/A2 | 0.3/0.2/0.3 | 10 |
| 5 | A1/B5/A1 | 0.3/0.2/0.3 | 9 |
| 6a | A1/B6/A1 | 0.3/0.2/0.3 | 9 |
| 6b | A2/B6/A2 | 0.3/0.2/0.3 | 10 |
| 6c | A3/B6/A3 | 0.3/0.2/0.3 | 11 |
| 7 | A2/B7/A2 | 0.3/0.2/0.3 | 10 |
| 8 | A2/B8/A2 | 0.3/0.2/0.3 | 10 |
| 9 | A2/B9/A2 | 0.3/0.2/0.3 | 10 |

TABLE 6

| Example | PVAc content of PVB [mol %] indiv. film B | Damping [%] of 1st mode with frequency in [Hz] at different temperatures | | | | | | | | | | Plasticizer wt % |
|---|---|---|---|---|---|---|---|---|---|---|---|---|
| | | [Hz] | 10° C. | [Hz] | 15° C. | [Hz] | 20° C. | [Hz] | 25° C. | [Hz] | 30° C. | |
| 1 | 7 | 179 | 11 | 152 | 21 | 128 | 23 | 116 | 18 | 110 | 11 | 38.2 |
| 2a | 1 | 180 | 10 | 154 | 20 | 128 | 23 | 117 | 18 | 111 | 11 | 39 |
| 2b | 1 | 186 | 8 | 161 | 18 | 137 | 23 | 123 | 19 | 114 | 13 | 38.4 |
| 2c | 1 | 190 | 7 | 173 | 15 | 141 | 23 | 123 | 22 | 116 | 15 | 37.6 |
| 3 | 1.1 | 186 | 9 | 161 | 18 | 137 | 24 | 118 | 22 | 111 | 14 | 38 |
| 4 | 7 | 182 | 10 | 161 | 19 | 134 | 25 | 118 | 21 | 110 | 13 | 37.5 |
| 5 | 6.9 | 173 | 13 | 149 | 21 | 128 | 23 | 115 | 18 | 109 | 11 | 38.2 |
| 6a | 7.1 | 166 | 17 | 135 | 25 | 117 | 21 | 109 | 15 | 106 | 9 | 38.9 |
| 6b | 7.1 | 174 | 15 | 142 | 25 | 123 | 24 | 112 | 17 | 108 | 11 | 38.2 |
| 6c | 7.1 | 183 | 12 | 157 | 21 | 128 | 25 | 118 | 18 | 111 | 12 | 37.7 |
| 7 | 6.5 | 185 | 9 | 160 | 19 | 131 | 24 | 119 | 18 | 110 | 12 | 38.3 |
| 8 | 6 | 181 | 10 | 161 | 19 | 136 | 25 | 118 | 21 | 110 | 13 | 37.6 |
| 9 | 5.4 | 185 | 7 | 171 | 15 | 134 | 20 | 122 | 23 | 112 | 15 | 37.8 |

As can be seen from the examples given above, the same or better damping characteristics are obtained with the interlayer films according to the invention comprising at least one individual film with an acetate content between 5-8 mol % in comparison with the normally used, highly saponified polyvinyl butyral films with a polyvinyl acetate content of 1 mol %. Examples 2a to 2c and 3 are comparative examples.

If one compares Examples 1 and 2a, it becomes surprisingly apparent that with individual films having a polyvinyl acetate content of 7 mol % and a polyvinyl acetal content of 78.2% by weight, the same or better damping characteristics are obtained as with individual films that with a correspondingly lower polyvinyl acetate content of 1 mol % which are more highly acetalized with a polyvinyl acetal content of 86.2% by weight. This applies analogously to the comparison of Example 2a and Example 5.

The resulting advantages within the scope of this invention are the lower cost of the polyvinyl alcohol used as raw material and the reduced consumption of butyraldehyde for the production of the interlayer films with a higher polyvinyl acetate content of 5-8 mol %.

In the comparison of Example 1 and 2a and Example 2a and Example 5, savings of about 8 parts by weight of butyraldehyde per 100 parts by weight of polyvinyl alcohol result. Analogous savings arise from the comparison of Example 3 and Example 4, which have an almost identical portion in wt % of polyvinyl alcohol groups.

What is claimed is:

1. A sound dampening interlayer film for laminated glass comprising at least two individual films of plasticizer-containing polyvinyl acetal, wherein a first individual film (A) comprises a polyvinyl acetal with a content of polyvinyl acetate groups of 0.1 to 11 mol % and a content of polyvinyl alcohol groups of 17 to 22% by weight,
    a second individual film (B) comprises a polyvinyl acetal with a content of polyvinyl acetate groups of between 5 and 7.9 mol %, and a content of polyvinyl alcohol groups of 11.5 to 13% by weight,
    the polyvinyl acetate group contents and/or plasticizer content being different in the respective films, and wherein the individual films have a plasticizer content which differs by at least 10% by weight, the plasticizer content of the second film (B) being higher than the first film (A).

2. The interlayer film of claim 1, wherein the first individual film (A) comprises a polyvinyl acetal with a content of polyvinyl alcohol groups of 18 to 21% by weight.

3. The interlayer film of claim 1, wherein the first individual film (A) comprises a polyvinyl acetal with a content of polyvinyl alcohol groups of 19.5 to 21.5% by weight.

4. The interlayer film of claim 1, wherein at least one of the films (A) and/or (B) further comprises 0.001 to 20% by weight of $SiO_2$.

5. The interlayer film of claim 1, wherein the interlayer film is produced by coextrusion of the individual films (A) and (B).

6. The interlayer film of claim 1, wherein at least one individual film (A) and/or (B) is fully or partially pigmented.

7. The interlayer film of claim 1, wherein a test piece produced with the interlayer film of 2 mm glass/0.8 mm interlayer film/2 mm glass has for a first mode damping value in accordance with ISO/PAS 16940 in the temperature range of 17.5-22.5° C. of greater than 22%.

8. The interlayer film of claim 1, wherein a test piece produced with the interlayer film of 2 mm glass/0.8 mm interlayer film/2 mm glass has for a first mode damping values in accordance with ISO/PAS 16940 at 10° C. of greater than 10%.

9. The interlayer film of claim 1 which is of a three layer (A)/(B)/(A) construction wherein the (A) layers of the (A)/(B)/(A) construction comprise first individual films (A) and the (B) layer comprises a second individual film (B).

10. The interlayer film of claim 1 which is present between two layers of glass in an automotive windshield.

11. The interlayer film of claim 1 which is a film of a photovoltaic module.

12. An interlayer film positioned directly between two glass panels, said interlayer film consisting of one or more first individual film(s)(A) and one or more second individual films (B) of claim 1.

13. The interlayer film of claim 1, consisting of one or more first individual films (A) and one or more second individual films (B).

14. The interlayer film of claim 13, wherein a second individual film (B) is located between two first individual films (A).

15. The interlayer film of claim 1, consisting of one first individual film (A) and one second individual film (B).

16. The interlayer film of claim 1 consisting of three film layers, a second individual film layer (B) positioned between two first individual films (A).

* * * * *